United States Patent [19]

Shomer

[11] 4,421,061
[45] Dec. 20, 1983

[54] SUSPENSION-TYPE POULTRY DRINKING FOUNTAIN

[75] Inventor: Yair Shomer, Kibbutz Maagan Michael D.N. Menashe, Israel

[73] Assignee: Plasson Maagan Michael Industries Ltd., Kibbutz Maagan Michael, D.N. Menashe, Israel

[21] Appl. No.: 412,896

[22] Filed: Aug. 30, 1982

[30] Foreign Application Priority Data

May 14, 1982 [IL] Israel ........................................ 65778

[51] Int. Cl.³ .............................................. A01K 7/00
[52] U.S. Cl. ..................................................... 119/81
[58] Field of Search ....................... 119/72, 74, 75, 78, 119/81

[56] References Cited

U.S. PATENT DOCUMENTS

| | | | |
|---|---|---|---|
| 3,092,078 | 6/1963 | Goswick | 119/81 |
| 3,283,746 | 11/1966 | Rüter | 119/81 |
| 3,368,579 | 2/1968 | Godshalk | 119/81 |
| 3,590,782 | 7/1971 | Kantor | 119/81 |
| 3,675,627 | 7/1972 | Myers | 119/81 |
| 3,685,495 | 8/1972 | Kantor | 119/81 |
| 4,164,201 | 8/1979 | Vanderhye | 119/81 |
| 4,192,257 | 3/1980 | Urzi | 119/81 |
| 4,215,653 | 8/1980 | Pirovano | 119/81 |
| 4,248,178 | 2/1981 | Kneubuehl | 119/75 |

Primary Examiner—Gene Mancene
Assistant Examiner—Kris R. Schulze
Attorney, Agent, or Firm—Benjamin J. Barish

[57] ABSTRACT

A suspension-type poultry drinking fountain comprises a hanger assembly adapted to be supported in suspension, and a bowl supported by the hanger assembly and containing a water trough for receiving water to be made available for drinking by the poultry. The hanger assembly and bowl include a bayonet-pin-and-socket connection permitting quick attachment and detachment of the bowl with respect to the hanger assembly.

14 Claims, 3 Drawing Figures

SUSPENSION-TYPE POULTRY DRINKING FOUNTAIN

CROSS REFERENCE TO RELATED APPLICATION

The present application is related to my copending application Ser. No. 336,830 filed Jan. 4, 1982, and assigned to the same assignee as of the present application.

BACKGROUND OF THE INVENTION

The present invention is particularly useful with respect to the suspension-type of poultry drinking fountains illustrated in our Israel Patent Specification Nos. 32070 and 34826, which fountains include arrangements for automatically replenishing the water as the poultry drink from the fountain. The invention is therefore described below with respect to such fountains.

An object of the invention is to provide a poultry drinking fountain of the suspension-type but including a number of important improvements, as will be described more particularly below.

SUMMARY OF THE INVENTION

Thus, according to one aspect of the present invention, there is provided a suspension-type poultry drinking fountain comprising a hanger assembly adapted to be supported in suspension, and a bowl supported by said hanger assembly and containing a water trough for receiving water to be made available for drinking by the poultry; characterized in that said hanger assembly and bowl include a bayonet-pin-and-socket connection permitting quick attachment and detachment of said bowl with respect to the hanger assembly.

More particularly with respect to this aspect of the invention, the hanger assembly comprises a water inlet and a tubular water outlet projecting laterally of the hanger assembly and serving as the bayonet-pin of said connection; the upper end of said bowl being formed with a bayonet-slot for receiving said tubular water outlet in a quickly attachable and detachable manner. In the preferred embodiment of the invention described below, the hanger assembly includes two tubular outlets at diametrically opposite sides of a circular-section portion of the hanger assembly; the upper end of said bowl being formed with a circular socket receiving said circular section of the hanger assembly; the wall of said circular socket being formed with two of said bayonet-slots at diametrically opposite locations thereof for receiving said two tubular outlets of the hanger assembly in a quickly attachable and detachable manner.

According to another aspect of the invention, the hanger assembly comprises a vertical stem of circular section adapted to be supported in suspension from its upper end; a horizontal, annular, resilient gasket circumscribing said stem; a valve housing including a water inlet, a water outlet, and a vertically extending hollow conduit member therebetween and disposed to overlie said annular gasket; and a spring mounting said valve housing to said stem such that the weight of the water in the water trough compresses said spring to draw said hollow conduit member towards said annular gasket and thereby to automatically maintain a predetermined level of water in said water trough.

According to a further feature of the invention, the device further includes a conduit disposed along the outer face of said bowl, which conduit has one end attached to said tubular outlet of the valve housing, and the opposite end attached to said bowl so as to conduct the water to said water trough.

Poultry drinking fountains constructed in accordance with the foregoing features provide a number of advantages. One important advantage is that the bayonet-pin-and-socket connection between the hanger assembly and the bowl permits the bowl to be quickly detached for cleaning purposes without disassembling the assembly or the valve housing thereof. In addition, the valve housing construction provides an improved valving arrangement for controlling the water flow to the water trough in response to the weight of the water in the trough. Thus, this construction produces a better seal between the annular gasket and the hollow conduit member which overlies it, and also better distributes the wear on the annular gasket so as to substantially increase its life. Further, this construction enables the gasket to be more conveniently cleaned, for example, by merely rotating the hollow conduit member to cause its outer edge to scrape away any dirt on the annular gasket. In addition, this construction permits the fountain to be used with a wider range of water pressures, and also permits the valve opening to be made very large so as to obviate the need for filters. Further, this construction permits the fountain to be made of a few simple parts which do not require critical dimensioning, thereby facilitating their assembly, disassembly and maintenance. Still further, the conduits provided between the tubular outlets and the water trough may be used to conduct the water directly from the outlet to the water trough without wetting the outer face of the bowl, thereby substantially decreasing the tendency of the bowl to become dirty and the need for frequent cleaning.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
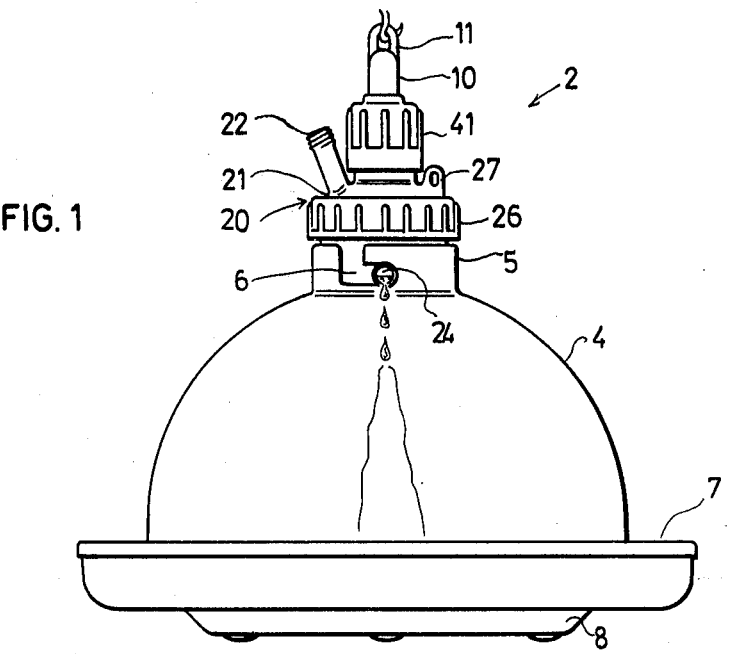
FIG. 1 is a side elevational view illustrating one form of suspension-type poultry drinking fountain constructed in accordance with the present invention.

The poultry drinking fountain illustrated in the drawings comprises a hanger assembly, generally designated 2, adapted to be supported in suspension; a bowl, generally designated 4, including at its upper end a circular section 5 formed with bayonet-slots 6 for attachment to the hanger assembly and containing, at its lower end, a water trough 7 for receiving water to be made available for drinking by the poultry; and a ballast bottle 8 attachable to the lower end of the hanger assembly and disposed within the bowl 4 for minimizing swinging of the fountain when suspended. As shown particularly in FIG. 2, the ballast bottle 8 depends slightly below the bottom of the water trough 7, so that the fountain may also be supported directly on the ground from the ballast bottle, this being desirable in order to locate the water trough 7 close to the ground for access by young chicks.

With respect to the hanger assembly 2, the main components are: a vertical stem, generally designated 10, for supporting the fountain in suspension; a valve housing, generally designated 20, including a water inlet, a water outlet, and a valve for controlling the flow of the water to the water through 7; an annular resilient gasket, generally designated 30, circumscribing the stem 10 and cooperable with the valve housing 20 for controlling the flow of the water to the latter housing; and a coil spring 40 mounting the valve housing to the stem such that the weight of the water in the water trough 7 controls the valve within the valve housing 20 to automatically maintain a predetermined level of water within the water trough.

Thus, as the poultry drink from the water within the trough 7, the spring mounting of the bowl 4 and hanger assembly 2 is such that the valve within the valve housing 20 of the hanger assembly automatically replenishes the water so as to maintain the water at a predetermined level in the trough. In addition, the bowl 4 is mounted to the hanger assembly 2 in such a manner, namely by the bayonet-slots 6, permitting quick attachment and detachment of the bowl with respect to the hanger assembly, and also permitting the cleaning of the bowl whenever desired without disturbing the valve housing or otherwise disassembling any of the other parts of the fountain.

More particularly, the stem 10 is of hollow tubular construction. It includes a hook or eye 11 at its upper end for attachment, as by a rope or cord, to an overhead ceiling for supporting the fountain in suspension. Stem 10 is further formed with an annular shoulder 12 about mid-way of its length for a purpose to be described below. The bottom end of the stem terminates in an annular flange 13 adapted to receive a collar 14. Collar 14 is internally threaded, as shown at 15, for threading onto the externally-threaded neck 16 of the ballast bottle 8. In addition, stem 10 is formed with an annular rib 17 just above collar 14 to prevent the accidental removal of the collar.

The valve housing 20 is comprised of an upper section 21 containing a tubular water inlet 22; a lower section 23 containing two water outlets 24, 25; and a collar 26 receivable on the upper housing section 21 and threadable to the lower housing section 23 for attaching the two sections together The upper valve housing section 21 further includes a hollow conduit member 27 depending in the vertical direction below the water inlet 22 and serving as an extension thereof. The upper housing section 21 further includes a hook or eye 27' for supporting the hanger assembly in suspension when the bowl 4 is detached for purposes of cleaning.

The lower valve housing section 23 includes an outer wall 28 of circular configuration received within the upper circular section 5 of the bowl 4, and an inner wall 29 also of circular section received on stem 10 of the hanger assembly. The two water outlets 24, 25 of the lower valve housing section 23 are tubular outlets projecting laterally at diametrically opposite sides of the housing, and serve as bayonet-pins cooperable with the bayonet-slots 6 formed at the upper end of bowl 4. It will thus be seen that the bowl 4 may be quickly attached to the valve housing 20 by passing the tubular outlets 24, 25 into the bayonet-slots 6 on the opposite sides of the upper end of the bowl 4, and rotating the bowl to fix the tubular outlets within the slots. It will also be appreciated that the bowl can be as quickly detached from the valve assembly by rotating the bowl in the opposite direction with respect to the tubular outlets 24, 25.

The annular resilient gasket 30, cooperable with the tubular conduit 26 of the valve assembly for controlling the flow of the water to the trough 7, is supported on a holder 31 received over the hollow stem 10. For this purpose, holder 31 is formed with an upper annular section 32 of slightly larger diameter than the outer diameter of the stem 10 so as to be received thereover, and with a lower annular section 33 of enlarged diameter so as to be received over wall 29 of the valve assembly 20 applied over the outer face of the stem. The juncture between the two sections 32 and 33 is defined by an annular shoulder 34 adapted to engage the outer annular shoulder 12 on stem 10 for fixing the position of holder 31 on the stem.

The lower end of holder 31 is formed with an annular ledge 35 for receiving the annular resilient gasket 30. Thus, the gasket 30 is firmly supported in a horizontal position by means of holder 31.

The coil spring 40, which provides the spring mounting for the valve housing 20, is interposed between the upper end of the gasket holder 31, and a collar 41 threaded over the upper section 21 of the valve housing 20. It will be appreciated that the more the collar 41 is threaded onto housing section 21, the greater the compression applied by the collar to spring 40, thereby increasing the force applied by the spring in supporting the valve housing 20. Accordingly, collar 41 may be used for varying the force of spring 40, and thereby the level of the water maintained within the annular trough 7.

Figure 2:
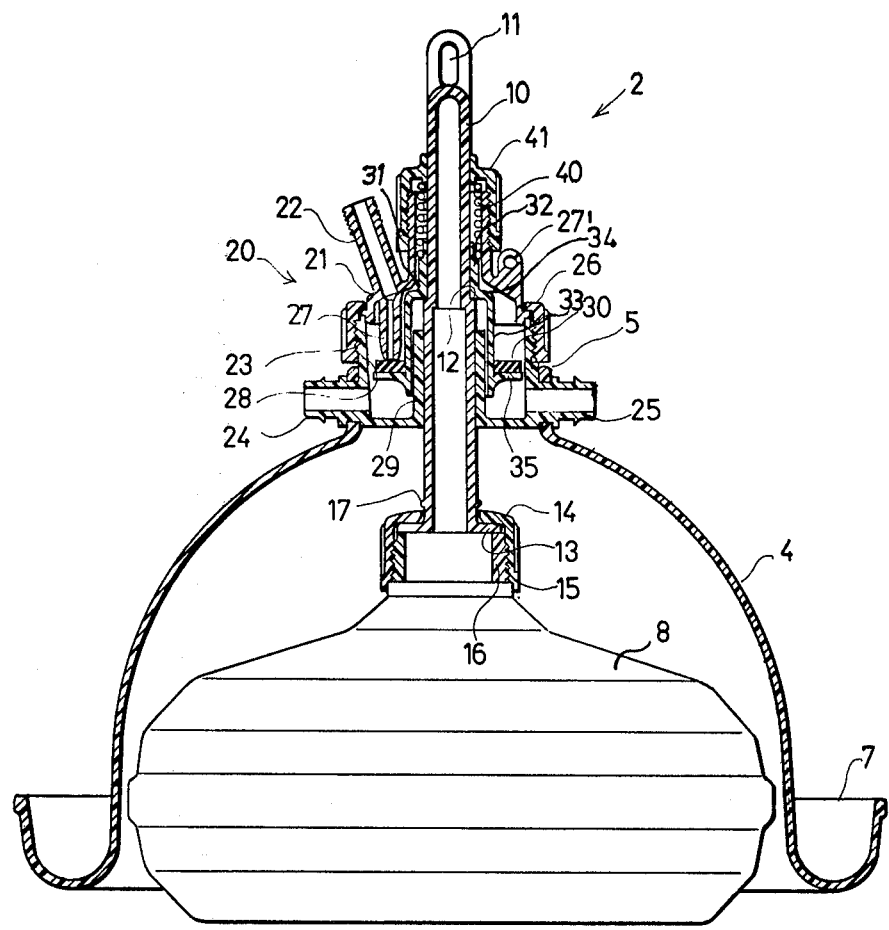
FIG. 2 is an enlarged sectional view along lines II—II of FIG. 1.

The poultry drinking fountain illustrated in FIGS. 1 and 2 of the drawings operates in the following manner: First, collar 41 is threaded onto the upper section 21 of the valve housing 20 an appropriate amount according to the desired water level to be maintained within the water trough 7. The fountain may then be suspended, by means of hook 11 of the hanger 10, to a suitable overhead support, with the ballast bottle 8 applied to the lower end of the hanger stem 10. Thus, the valve housing 20, including the bowl 4 and the water trough 7 attached thereto, is supported from the hanger stem 10 by means of the coil spring 40. The tubular inlet 22 of the valve housing 20 is then connected to a water supply.

At the start, there is no water within trough 7, so that the weight of the bowl 4, together with that of the valve housing 20, causes spring 40 to support the valve housing 20 such that the lower edge of the inlet conduit 26 within the valve housing is spaced upwardly from the annular gasket 30. Accordingly, water inletted into the tubular inlet 22 will flow between conduit 26 and gasket 30 to the tubular outlets 24, 25, and from there, along the outer face of the bowl 4 to the annular trough 7. This water increases the weight of bowl 4, thereby causing the valve housing 20, to which the bowl is secured, to lower until the water reaches a level within trough 7 such that its weight causes the tubular conduit 26 to engage the annular gasket 30, thereby terminating the further flow of water into the annular trough.

As the poultry drink from the annular trough, the water level drops, thereby permitting the valve housing 20 to rise again under the influence of spring 40, such that the lower edge of the tubular conduit 26 disengages from the upper face of the annular gasket 30, thereby permitting more water to enter via the inlet 22 and to exit via the outlet 24, until the predetermined water level within the trough is again reached. The valve arrangement thus automatically controls the water flow to the trough 7 so as to maintain the desired water level within the trough.

Whenever it may be desired to clean the water bowl 4, it is only necessary to rotate the bowl so as to move the tubular outlets 24, 25 out of the bayonet-slots 6 in the upper circular section of the bowl 4, permitting the bowl to be manually removed. Since the valve housing 20 is thereby lightened, the tubular duct 26 is moved away from the annular gasket 30, and therefore it would be necessary to first turn off the water supply before removing the bowl. However, it is not necessary to disassemble the valve housing 20 or to remove any other members. During this cleaning operation, hook 27 of the valve housing 20 may be used for suspending the valve housing while the bowl is being cleaned. As soon as the bowl has been cleaned, it may be quickly reattached by inserting the upper circular section 5 of the bowl into the bottom of the valve housing 20, with the tubular outlet 24, 25 passing through the bayonet-slots 6, and then rotating the bowl so as to fix it to the valve housing by this bayonet-pin-and-slot connection.

Figure 3:
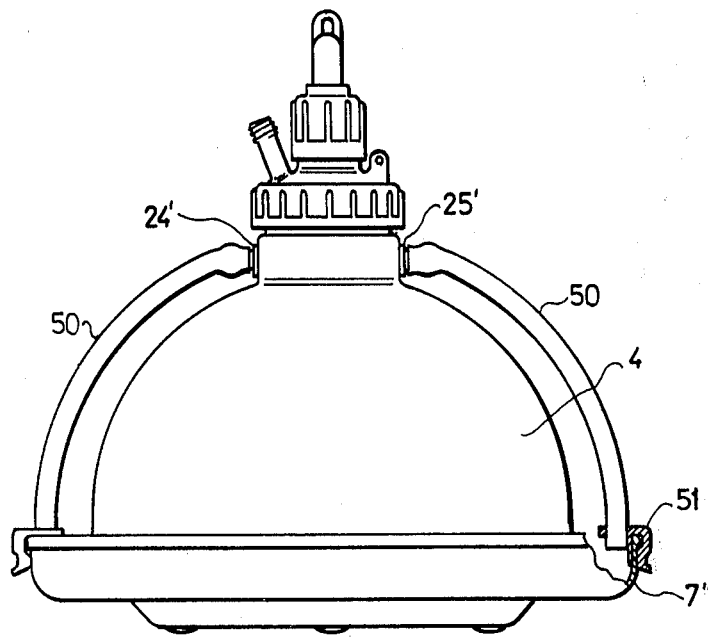
FIG. 3 is a side-elevational view of the poultry drinking fountain illustrated in FIGS. 1 and 2, but further including the optional use of water conduits applied to the outer face of the bowl for conducting the water to the water trough without dirtying the bowl.

FIG. 3 illustrates an optional feature of providing a tubular conduit 50 to one or both of the tubular outlets 24', 25', to conduct the water from these outlets directly to the annular trough 7'. Thus, each conduit 50 may be made of simple plastic rubber tubing, having one end slipped over the respective tubular outlet 24', 25', and the opposite end having a clip 51 attachable to the upper edge of the trough 7'. Thus, the water is conducted from the tubular outlets 24' and 25' directly to the annular trough 7' without wetting the outer face of the bowl 4. Since the outer face of the bowl is thereby not wetted by the water, it remains clean for a longer period of time, thereby decreasing the frequency for cleaning the bowls.

It will thus be seen that the illustrated construction provides an arrangement for quickly attaching and detaching the bowl 4 for cleaning or other purposes without disassembling or otherwise altering the remainder of the fountain. Moreover, the described valving arrangement, including the annular gasket 30 cooperable with the lower edge of the tubular conduit 26 carried by the valve housing 20, provides a more efficient valve for terminating the flow of the water when the desired level has been reached within the annular trough 7. In addition, this arrangement permits the wear to be distributed around the annular gasket 30, thereby greatly extending the use life of the gasket. Further, the described arrangement permits the gasket to be cleaned more efficiently, for example by merely rotating the upper section 21 of the valve housing 20 so as to cause the lower edge of the tubular conduit 26 to scrape away any dirt on the upper face of the annular gasket 30.

Still further, the described arrangement provides large area water passages for the flow of the water thereby obviating the need for filters. Moreover, it permits the device to be operated over a wider range of pressures that may be available at the location where the fountain is to be used. For example, the existing poultry drinking fountains of this type usually require a water pressure source of no more than about one-half atmosphere, whereas the described arrangement permits water sources to be used up to 1.5 atmospheres.

The described arrangement provides a number of further advantages, in that it requires but a single hanger, a single valve seal (the annular gasket 30), and a single spring (spring 40), as compared to the previously-described devices which usually required two hanger stems and two springs. Further, the described arrangement may be constructed of a few and simple parts which do not require critical dimensioning, thereby decreasing the manufacturing and maintenance costs of the fountain. Still further, the fountain can be used for young chicks, by merely supporting it on the ground, wherein the ballast bottle maintains the bowl 4 slightly raised from the ground with the described valve assembly operative to automatically regulate the level of the water within the annular trough 7. Some still further advantages in the described arrangement are that it permits both the valve assembly and the water bowl to be of shorter height, thereby decreasing the overall height of the fountain, and also permits the bowls 4 to be stacked for storage or shipment.

While the invention has been described with respect to one preferred embodiment, it will be appreciated that many other variations, modifications and applications of the invention may be made.

What is claimed is:

1. A suspension-type poultry drinking fountain comprising a hanger assembly adapted to be supported in suspension, and a bowl supported by said hanger assembly and containing a water trough for receiving water to be made available for drinking by the poultry; characterized in that said hanger assembly comprises a water inlet and a tubular water outlet projecting laterally of the hanger assembly, and the upper end of said bowl includes a slot forming with said tubular water outlet a bayonet-pin-and-socket connection permitting quick attachment and detachment of said bowl with respect to this hanger assembly.

2. The fountain according to claim 1, wherein said hanger assembly includes two tubular outlets at diametrically opposite sides of a circular-section portion of the hanger assembly; the upper end of said bowl being formed with a circular socket receiving said circular section of the hanger assembly; the wall of said circular socket being formed with two of said bayonet-slots at diametrically opposite locations thereof for receiving said two tubular outlets of the hanger assembly in a quickly attachable and detachable manner.

3. The fountain according to claim 1, wherein said hanger assembly comprises: a vertical stem of circular section adapted to be supported in suspension from its upper end; a horizontal, annular, resilient gasket circumscribing said stem; a valve housing including a water inlet, a water outlet, and a hollow conduit member therebetween and disposed to overlie said annular gasket;

and a spring mounting said valve housing to said stem such that the weight of the water in the water trough compresses said spring to draw said hollow conduit member towards said annular gasket and thereby to automatically maintain a predetermined level of water in said water trough.

4. The fountain according to claim 1, further including a connector at the lower end of said hanger assembly, and a ballast bottle connected to said hanger assembly by said connector for minimizing swinging of the fountain when supported in suspension.

5. The fountain according to claim 4, wherein the bottom of said ballast bottle is disposed slightly below the bottom of the water trough, to enable the fountain to be supported on the ground in suspension from said ballast bottle with the water trough raised slightly above the ground in order to make the water therein available for drinking by young chicks.

6. A suspended-type poultry drinking fountain comprising a hanger assembly adapted to be supported in suspension, and a bowl supported by said hanger assembly and containing a water trough for receiving water to be made available for drinking by the poultry; characterized in that said hanger assembly comprises: a vertical stem of circular section adapted to be supported in suspension from its upper end; a horizontal, annular, resilient gasket circumscribing said stem; a valve housing including a water inlet, a water outlet, and a vertically extending hollow conduit member therebetween and disposed to overlie said annular gasket;

and a spring mounting said valve housing to said stem such that the weight of the water in the water trough compresses said spring to draw said hollow conduit member towards said annular gasket and thereby to automatically maintain a predetermined level of water in said water trough.

7. The fountain according to claim 6, wherein said annular gasket is supported on an annular holder received on said stem, said stem being formed with an annular shoulder for fixing the position of said annular holder thereon.

8. The fountain according to claim 7, wherein said valve housing is springingly mounted to said stem by means of a coiled spring interposed between the upper end of said annular gasket holder and a collar threadedly attached to said housing for changing the force of said spring, and thereby the predetermined level of water in said water trough.

9. The trough according to claim 6, wherein said valve housing includes an upper annular section containing said water inlet and said hollow conduit member overlying said annular gasket, and a lower annular section containing said water outlet.

10. The fountain according to claim 6, wherein the lower end of said valve housing includes a tubular sleeve receivable on said stem between same and the lower end of said annular holder for the annular gasket.

11. The fountain according to claim 6, wherein said valve housing comprises a suspension member at its upper end for suspending the fountain when the bowl is removed for cleaning.

12. The fountain according to claim 6, further including a conduit disposed along the outer face of said bowl, which conduit has one end attached to said water outlet of the valve housing, and the opposite end attached to said bowl so as to conduct the water to said water trough.

13. The fountain according to claim 6, wherein said valve housing includes two tubular outlets at diametrically opposite sides of a circular-section portion of the valve housing, the upper end of said bowl being formed with a circular socket receiving said circular section portion of the valve housing, the wall of said circular socket being formed with two of said bayonet-slots at diametrically opposite locations thereof for receiving said two tubular outlets of the valve housing in a quickly attachable and detachable manner.

14. A suspension-type poultry drinking fountain comprising a hanger assembly adapted to be supported in suspension, and a bowl supported by said hanger assembly and containing a water trough for receiving water to be made available for drinking by the poultry; characterized in that said hanger assembly includes a water inlet, a tubular water outlet, and a conduit disposed along the outer face of said bowl, said conduit having one end attached to said tubular outlet and the opposite end attached to said bowl so as to conduct the water to said water trough without wetting the outer face of the bowl.

* * * * *